United States Patent Office 2,793,692
Patented May 28, 1957

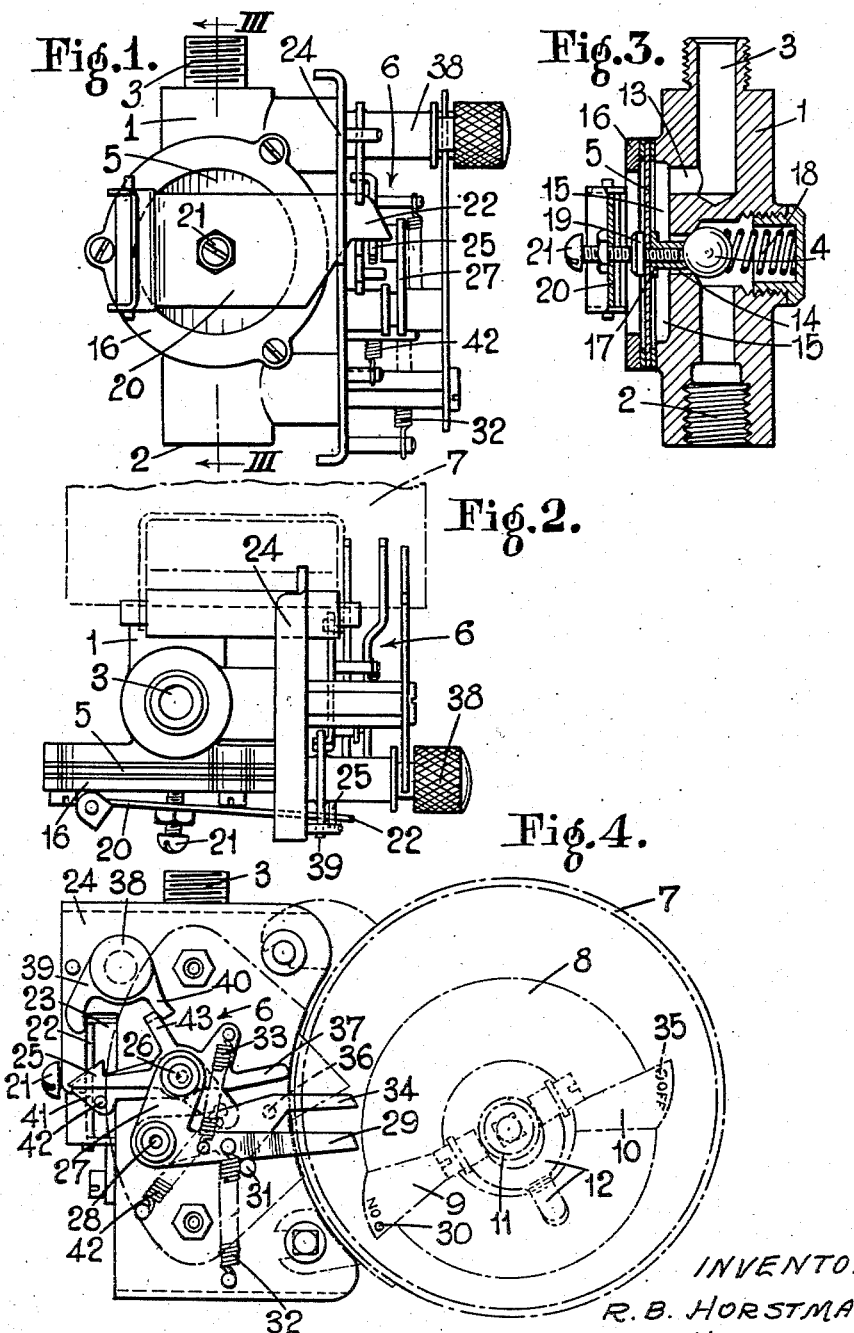

2,793,692
TIMER VALVE

Ronald Blessley Horstmann and Kenneth John Horstmann, Bath, England

Application July 23, 1954, Serial No. 445,392

Claims priority, application Great Britain September 16, 1953

4 Claims. (Cl. 161—7)

The present invention relates to fluid shut-off valves and has for its object to provide an improved valve which is fluid tight so that it may be used for handling either liquids or gases without the risk of leakage. In this respect the valve of this invention is particularly suited for controlling the flow of oil such as is used in oil fired burners, and is also particularly suitable for handling butane and other "thin" gases which would normally leak and escape from conical plug and similar rotatable valves.

According to the present invention there is provided a fluid shut-off valve which comprises a valve body, a displaceable valve member co-acting with a valve seating in said body for establishing or interrupting communication between inlet and outlet passages for the fluid, a diaphragm sealing an opening in the body and adapted to move the valve member with respect to its seating, and a movable member located exteriorly of the valve body and adapted to press on the diaphragm to actuate the valve.

According to a preferred embodiment, the diaphragm is pressed inwardly from outside to move the valve away from said valve opening, and is operated in any desired manner best suited to the requirements to be satisfied. Thus the diaphragm may be actuated manually or/and mechanically.

The valve member itself is preferably detached or separate from the diaphragm and may be of any desired form, e. g. a spring loaded ball, a mushroom valve, or a flap valve.

According to one convenient arrangement, the valve of this invention is actuated mechanically and is combined with a clockwork movement or other timepiece adapted to actuate the mechanical means at predetermined time intervals to effect opening and closing of said valve member.

By arranging that the valve member is actuated quickly, any serious build-up of internal pressure on the diaphragm, before establishing the full through flow from the inlet to the outlet, is prevented; i. e. if the valve were made to open slowly, the fluid during initial opening of the valve would tend to impinge upon the diaphragm in passing from the inlet to the outlet; whereas a uniform flow automatically takes place if the valve opens quickly, i. e. with a snap action.

To enable the invention to be readily understood an embodiment will be described by way of example in which the valve is provided with mechanism whereby it is operable automatically at predetermined times by an associated timepiece, and said embodiment is illustrated in the accompanying drawings wherein:

Figure 1 is a side elevation;

Figure 2 is a plan (with part of a timepiece indicated in broken lines);

Figure 3 is a vertical section through III—III of Figure 1; and

Figure 4 is an elevation looking from the right of Figure 1 (with a timepiece indicated in broken lines).

Referring to the drawings there is a valve body 1 with inlet and outlet 2 and 3 respectively, a ball valve 4 (Figure 3), a sealing diaphragm 5 (Figures 1 and 3), lever mechanism designated generally by the reference numeral 6 for moving the diaphragm, and a clockwork-operated timepiece 7 (Figures 2 and 4), having a time dial 8 (Figure 4) and adjustable "on" and "off" tappets 9 and 10 respectively for working the lever mechanism 6 at predetermined time intervals. The timepiece may be of any suitable construction, and in a well known form the time dial 8 rotates once in 24 hours and is graduated in twenty-four hourly divisions and fractions, and the tappets are radially adjustable on the arbor 11 and secured in position by a clamp 12.

As seen in Figure 3, inside the valve body 1 the inlet and outlet passages 2 and 3 are interconnected by a fluid transfer passage 13 into which fluid can flow from the inlet passage through the valve controlled opening 14 and then pass into the outlet. The said transfer passage 13 includes and leads from a shallow well 15 formed in the valve body and the mouth of this well at the outer surface of the valve body is closed by the aforesaid diaphragm 5 which is made of leather or other suitable fluid-tight flexible material which is clamped in position by an annular clamping ring 16 around its circumferential edge so as to prevent escape of fluid therearound.

The diaphragm 5 is fitted at its centre with a small metal plug 17 which projects from the inner face of the diaphragm so that its inner end is in juxtaposition with or lightly touching the ball valve 4 which latter closes the valve opening 14 through which the fluid can pass from the inlet 2 into said transfer passages 13 and 15 and from thence into the outlet passage 3. Thus, by applying pressure to the outer face of the diaphragm 5, i. e. from outside the body of the valve, the diaphragm can be flexed slightly and the plug 17 caused to move so as to thrust the valve 4 off its seating. In the present embodiment the valve is a spring loaded ball and the ball is moved away from its seating, when the diaphragm is flexed inwardly, against the influence of the spring 18 which is constantly urging the ball towards its seat and which subsequently reasserts itself to return the valve to a closing position when the pressure on the diaphragm from without is relaxed. Alternatively, however, the valve may be of any other suitable construction i. e. it can be a mushroom valve supported so that the plug of the diaphragm can act on the stem thereof, or it may be a flat or flap type of valve. Conveniently, the plug 17 of the diaphragm comprises, as shown, a head 19 which is disposed on the outer face of the diaphragm so as to constitute an abutment surface against which pressure may be applied to actuate the diaphragm.

As mentioned the valve is operated automatically in the illustrated embodiment at predetermined intervals of time under the control of the clockwork mechanism of the timepiece 7. One convenient arrangement permitting operation of the valve either manually or automatically according to requirements consists in providing the clamping ring 16 with a pivoted flap or valve control lever 20 which extends diametrically across the diaphragm and constitutes a movable element located exteriorly of the valve body and adapted to press on the diaphragm. This flap 20 is fitted with an actuating screw 21 which extends through the flap and engages with the abutment face of the aforesaid plug 19 on the outer face of the diaphragm. An advantage of this arrangement is that the screw can be set and locked in a position so as to pre-set an outer limit position of the diaphragm which will prevent engagement of the valve member 4 with its seating in order to obtain a variable degree of weep. This slight leakage would be useful, for example, with an oil fired boiler to ensure that the flame is not completely extinguished when the control valve is in the "off" position.

It will be appreciated that the valve can be operated by swinging said hinged flap 20 towards or away from the valve body. For this purpose the flap 20 is formed with a latching nose 22 which extends through a slot 23 in a base-plate 24 mounted on the valve body 1; the base-plate 24 carries the lever mechanism 6. The nose 22 is engaged by a claw 25 which pulls the flap 20 inwards to push the diaphragm and thus the ball valve 4 off its seating to the "on" position, or alternatively the claw is swung downwardly (with reference to Figures 1 and 4) to drop off the nose 22 and allow the flap 20 to move outwardly under the influence of the valve spring 18 (Figure 3), the claw then rising again to the position illustrated in Figure 4.

To operate the latching claw 25, it is carried on a pivot 26 mounted on the short arm 27 of a bell-crank pivoted to the base-plate 24 at 28. The long arm 29 of the bell-crank extends through the casing of the timepiece 7 into the path of a pin 30 projecting from the front of the "on" tappet 9. Thus, assuming the parts are in the "off" position shown, when the pin 30, travelling clockwise moves the arm 29 anti-clockwise with regard to Figure 4 away from the stop pin 31 and against the action of spring 32, the pivot 26 travels to the left and the inclined edge of the claw 25 rides on the edge of nose 22, said claw pivoting on 26 against the force of the spring 33; this spring is weaker than the spring 32. Eventually the point of the claw 25 passes the nose 22, whereupon the claw snaps up behind the nose in a latched position. By now the tappet pin 30 has passed the arm 29 allowing the latter to snap back under the force of the spring 32; this pulls the claw 25 to the right with respect to Figure 4 and the flap 20 is accordingly pulled towards the valve body and, through the medium of the diaphragm, opens the valve 4.

For the reverse or "off" movement, there is an off lever 34 loosely pivoted on the axis 28 and in a lower or more inward plane than the arm 29. This is in the path of the "off" tappet pin 35 projecting from the back of the "off" tappet 10. When the pin 35 encounters the lever 34 an inwardly projecting pin 36 carried by the lever 34 abuts against an arm 37 extending from the pivoted claw element 25 and unlatches the claw from the nose 25 permitting the flap 20 to re-assume the valve-closed ("off") position depicted in the drawings under the action of the valve spring 18.

A second claw lever 41, lying underneath the first-mentioned lever 25, has a claw which in the Figure 4 position is lying behind the claw 25. This second claw lever 41 pivots independently about the axis 26 and is constantly urged by a spring 42 upwardly so that its claw is either latching on the nose 22 (when the actuating claw 25 is also latching) or so that an upstanding pin 42 is abutting the lower edge of the caw 25. This serves the purpose of keeping the claw 25 up to its work and preventing a rebound from the latched position when the tappet pin 30 snaps off the lever 29.

To enable the mechanism to be operated manually, such as for testing purposes, a knobbed spindle 38 is provided and this is axially rotatable on the base-plate 24 so as partly to rotate the two fingers 39 and 40. The finger 40 can be pressed against an arm 43 on the claw member 25 to unlatch it from the nose 22, and (when unlatched) the finger 39 can press the nose inwards from the position seen in Figure 4 when it depresses the claw 25 which eventually springs up into the latched position.

We claim:

1. A fluid shut-off valve, including a valve body provided at one side with a well, a sealing diaphragm assembly for said well, said body having axially alined medially blocked inlet and outlet passages and also having a first lateral passage establishing communication with said inlet passage and the well and a second lateral passage establishing communication between the well and the outlet passage, a valve seat on the inlet side of the first lateral passage, a valve normally spring pressed toward said seat for closing said first lateral passage, valve opening screw means medially engaged with the diaphragm and having its inner end engageable with the valve, a valve control lever hingedly supported at one end to a portion of the diaphragm assembly and medially adjustably engaged with said screw means for movement towards or away from said valve body, a base plate mounted on the valve body and having a slot for receiving the free end of the control lever, a spring-biased bell crank lever pivoted to said base plate, a spring-biased claw lever pivoted to one arm of the bell-crank lever and disposed in a plane at right-angles to the said free end of the control lever, control means for swinging the bell crank lever to cause the claw lever to engage and move the control lever to a position in which it holds the valve open, and release means for disengaging the claw lever from the control lever to permit the latter to move to close the valve.

2. A fluid shut-off valve according to claim 1, wherein, the valve opening screw means includes a tapped plug having one end engaging the valve and its other end provided with a flange abutting the well side of the diaphragm and a head engaging the outer side of the said diaphragm, a screw adjustably engaging the valve control lever and through said head and plug controlling the position of the valve relative to its seat, and means for setting and locking said screw in position to pre-set an outer limit position of the diaphragm and prevent engagement of the said valve with its seat to obtain a variable degree of weep.

3. A fluid shut-off valve including a valve body provided at one side with a well, a sealing diaphragm assembly for said well, said body having axially alined medially blocked inlet and outlet passages and also having a first lateral passage establishing communication with said inlet passage and the well and a second lateral passage establishing communication between the well and the outlet passage, a valve seat on the inlet side of the first lateral passage, a valve normally spring pressed toward said seat for closing said first lateral passage, valve opening screw means medially engaged with the diaphragm and having its inner end engageable with the valve, a valve control lever hingedly supported at one end to a portion of the diaphragm assembly and medially adjustably engaged with said screw means for movement towards or away from said valve body, a base plate mounted on the valve body and having a slot for receiving the free end of the control lever, a bell crank lever disposed at right-angles to the said free end of the control lever and having short and long arms pivoted to the base plate and spring biased clockwise to normal at-rest position, a first claw lever for engaging the valve control lever to hold the valve open, said claw lever pivoted to the short arm of the bell crank lever and also spring biased clockwise to the long arm of the bell crank lever, a second claw lever lying beside and pivoted co-axially with the first claw lever for engaging the valve control lever simultaneously with the first claw lever, and also spring biased clockwise to the base plate, a lateral pin on the second claw lever for engaging the first claw lever when both are in latching relation to the control lever to prevent rebound from the latched position when the long arm of the bell crank lever is released by control means.

4. A fluid shut-off valve according to claim 3, wherein the first claw lever has a release arm disposed substantially radially opposite the claw end, a release lever loosely pivoted co-axially with the bell crank lever and having a lateral pin for engaging said release arm when the release lever is moved counter-clockwise by said control means to cause the first and second claw levers to disengage the control lever.

References Cited in the file of this patent

UNITED STATES PATENTS

| | | |
|---|---|---|
| 1,142,608 | Newbold | June 8, 1915 |
| 1,533,200 | Marsh | Apr. 14, 1925 |
| 1,995,070 | Lux | Mar. 19, 1935 |
| 2,192,578 | Michaels | Mar. 5, 1940 |
| 2,309,388 | Gibbons et al. | Jan. 26, 1943 |
| 2,463,921 | Titcomb | Mar. 8, 1949 |
| 2,614,395 | King | Oct. 21, 1952 |
| 2,629,437 | Weeks | Feb. 24, 1953 |